US011997759B2

(12) United States Patent
Sambangi et al.

(10) Patent No.: US 11,997,759 B2
(45) Date of Patent: May 28, 2024

(54) AUTOMATED SENSOR INTEGRATION AND DATA COLLECTION

(71) Applicant: Skylo Technologies, Inc., Palo Alto, CA (US)

(72) Inventors: Sreedhar Sambangi, Newark, CA (US); Ankit Kanubhai Patel, Ahmedabad (IN); Nitin Gaikwad, Fremont, CA (US); Meghna Agrawal, Cupertino, CA (US); Andrew Nuttall, Mountain View, CA (US)

(73) Assignee: Skylo Technologies, Inc., Palo Alto, CA (US)

( * ) Notice: Subject to any disclaimer, the term of this patent is extended or adjusted under 35 U.S.C. 154(b) by 246 days.

(21) Appl. No.: 17/482,988

(22) Filed: Sep. 23, 2021

(65) Prior Publication Data

US 2023/0087291 A1 Mar. 23, 2023

(51) Int. Cl.
*H04W 84/18* (2009.01)
*H04L 41/0803* (2022.01)
*H04W 4/38* (2018.01)
*H04W 24/02* (2009.01)
*H04W 24/10* (2009.01)

(52) U.S. Cl.
CPC ......... *H04W 84/18* (2013.01); *H04L 41/0803* (2013.01); *H04W 4/38* (2018.02); *H04W 24/02* (2013.01); *H04W 24/10* (2013.01)

(58) Field of Classification Search
None
See application file for complete search history.

(56) References Cited

U.S. PATENT DOCUMENTS

| 6,952,656 | B1 | 10/2005 | Cordova et al. |
| 9,633,197 | B2 | 4/2017 | Lakshmanan |
| 9,800,468 | B2 | 10/2017 | Smith et al. |
| 2008/0046205 | A1* | 2/2008 | Gilbert .................. G01D 4/004 702/62 |
| 2017/0214529 | A1 | 7/2017 | Oliveira et al. |
| 2017/0337806 | A1 | 11/2017 | Cohn et al. |
| 2021/0160698 | A1* | 5/2021 | Sevindik ............... H04W 28/16 |

(Continued)

OTHER PUBLICATIONS

Notification of Transmittal of the International Search Report and the Written Opinion of the International Searching Authority, or the Declaration, International Application No. PCT/US 22/75492, Dated Nov. 25, 2022.

*Primary Examiner* — Alex Skripnikov
*Assistant Examiner* — Angelie T Ngo
(74) *Attorney, Agent, or Firm* — Brian R Short

(57) ABSTRACT

Apparatuses, methods, and systems for automated sensor integration and data collection. One method includes managing, by a platform server, a sensor library that includes sensor information for a plurality of sensors, receiving, by the platform server, from a user, a selection of a sensor from the sensor library and a selection of an associated datum, generating, by the platform server, a configuration based on the selected sensor and the associated datum, communicating, by the platform server, the configuration to a computing device over a wireless link, receiving, by the computing device, the configuration, updating, by the computing device, with the configuration, and transmitting and receiving, by the computing device, data with the selected sensor based on the configuration.

20 Claims, 8 Drawing Sheets

(56) References Cited

U.S. PATENT DOCUMENTS

| | | | | |
|---|---|---|---|---|
| 2021/0266771 A1* | 8/2021 | Exner | ................... | H04W 88/08 |
| 2022/0109729 A1* | 4/2022 | Bloss | ..................... | G16Y 40/20 |
| 2022/0110003 A1* | 4/2022 | Kruse | ................... | H04W 40/10 |
| 2023/0213920 A1* | 7/2023 | Kallus | ...................... | G06N 7/01 |
| | | | | 702/188 |

* cited by examiner

Examples of:
Sensor Access Configuration
Datum Access Configuration

Sensor Access Configuration
410

[
Interface: BLE

Communication Mode: Beacon

Device Init Command: 0x13
]

Datum Access Configuration
420

[
Query Command: 0xA3

Value Length (Byte): 4

Offset: 0xDE

Conversion Multiplier: 0.723

Datum Profile ID: 123
]

Datum Value 430
(over air)

[ Value: 0x13 ]

Datum Profile 440
(within the Datum
Access Configuration 420)

[
ID: 123

Type: Float

Length: 4 Byte

Unit: Celsius
]

Figure 4

AUTOMATED SENSOR INTEGRATION AND DATA COLLECTION

FIELD OF THE DESCRIBED EMBODIMENTS

The described embodiments relate generally to wireless communications. More particularly, the described embodiments relate to systems, methods, and apparatuses for automated sensor integration and data collection.

BACKGROUND

Current data networks are designed primarily for human users and the network and traffic characteristics that human users generate. The growth and proliferation of low-cost embedded wireless sensors and devices pose a new challenge of high volumes of low bandwidth devices vying for access to limited network resources. One of the primary challenges with these new traffic characteristics is the efficiency at which the shared network resources can be used. For common low bandwidth applications such a GPS tracking, the efficiency (useful/useless data ratio) can often be below 10%. This inefficiency is the result of large volumes of devices communicating in an uncoordinated environment. Addressing this problem is fundamental to the future commercial viability of large-scale sensor network deployments.

It is desirable to have methods, apparatuses, and systems for automated sensor integration and data collection.

SUMMARY

An embodiment includes a method of automated sensor integration and data collection. The method includes managing, by a platform server, a sensor library that includes sensor information for a plurality of sensors, receiving, by the platform server, from a user, a selection of a sensor from the sensor library and a selection of an associated datum, generating, by the platform server, a configuration based on the selected sensor and the associated datum, communicating, by the platform server, the configuration to a computing device over a wireless link, receiving, by the computing device, the configuration, updating, by the computing device, with the configuration, and transmitting and receiving, by the computing device, data with the selected sensor based on the configuration.

Another embodiment includes an automated sensor integration and data collection system. The system includes a platform server operative to manage a sensor library that includes sensor information for a plurality of sensors, receive from a user, a selection of a sensor from the sensor library and a selection of an associated datum, generate a configuration based on the selected sensor and the associated datum, and communicate the configuration to a computing device over a wireless link. The system further includes the computing device operative to receive the configuration, update with the configuration, and transmit and receive data with the selected sensor based on the configuration.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 4 shows a sensor access configuration, a datum access configuration, a datum value, and a datum profile, according to an embodiment.

DETAILED DESCRIPTION

The embodiments described include methods, apparatuses, and systems for automated sensor integration and data collection.

Figure 1:
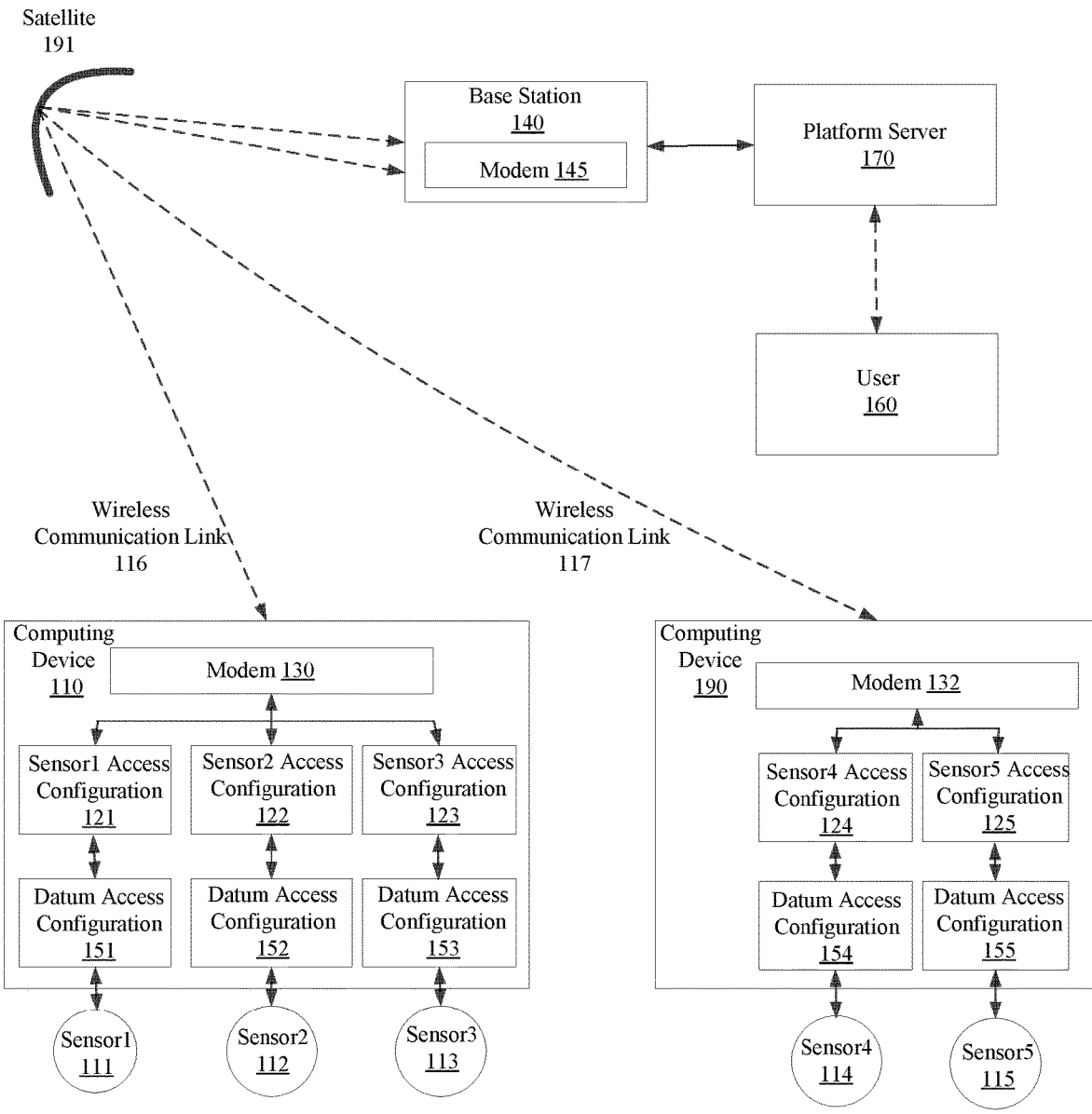
FIG. 1 shows a plurality of computing devices that communicate data of sensors through a satellite link and a base station to a platform server, according to an embodiment.

FIG. 1 shows a plurality of computing devices 110 190 that communicate data of sensors 111, 112, 113, 114, 115 through a wireless link (through satellite 191) to a base station 140, according to an embodiment. For an embodiment, a platform server 170 operates to generate scheduling of the wireless communication between the base station 140 and the plurality of computing devices 110, 190 through wireless links 115, 116. For an embodiment, the platform server 170 may access a database of, for example, a network management element, aid in generating the scheduled communication, and provide the scheduled communication to the base station 140. For an embodiment, the scheduled communication includes allocating frequency and time slots for both uplink and downlink wireless communication. For an embodiment, the base station 140 includes a modem 145 and the hubs 110, 190 include modems 130, 132, for enabling the wireless communication between the base station 140 and the computing devices 110, 190.

For an embodiment, a user 160 selects a sensor (such as, one or more of sensors 111, 112, 113, 114, 115) and associate datum for facilitating reporting and communication between the sensors 111, 112, 113, 114, 115 and the corresponding computing device 110, 190. As will be described, for an embodiment, the platform server 170 generates a configuration based on the selected sensor and the associated datum. The configuration is communicated from the platform server 170 to the computing devices 110, 190 through the wireless communication links 115, 116. The computing devices 110, 190 communicate with the sensors (111-115) based on the configuration.

It is to be understood that the sensors 111, 112, 113, 114, 115 can vary in type, and can each require very different data reporting characteristics. The wireless satellite links 116, 117 links are a limited resource, and the use of this limited resource should be judicious and efficient. In order to efficiently utilize the wireless satellite links 116, 117, each of the sensors 111, 112, 113, 114, 115 are provided with sensor access configurations 121-125 and datum access configurations 151-155 that coordinate the timing (and/or frequency) of reporting (communication by the computing devices 110, 190 to the base station 140 through the wireless satellite links 116, 117) of the data provided by the sensors 111, 112, 113, 114, 115.

For an embodiment, a platform server 170 includes a database in which the sensor access configurations 121-125 and datum access configurations 151-155 can be stored and maintained. Further, the platform server 170 manages the sensor access configurations 121-125 and datum access configurations 151-155 wherein the management includes ensuring that synchronization is maintained during the data reporting by the computing devices 110, 190 of the data of each of the sensors 111, 112, 113, 114, 115. That is, the data reported by each computing device 110, 190 of the data of the sensors 111, 112, 113, 114, 115 maintains synchronization of the data reporting of each of the sensors 111, 112, 113, 114, 115, relative to each other. Again, the platform server 170 ensures this synchronization through management of the sensors 121, 122, 123, 124, 125. The synchronization between the sensors 111, 112, 113, 114, 115 distributes the timing of the reporting of the data of each of the sensors 111, 112, 113, 114, 115 to prevent the reporting of one sensor from interfering with the reporting of another sensor and provides for efficiency in the data reporting.

As described, for an embodiment, the platform server 170 communicates the configuration to the computing devices. For an embodiment, the configuration includes a description and set of instructions to facilitate bi-directional communication between the computing device, and sensors or other devices. Further, the configuration includes instructions to transmit and receive specific data fields with the sensors or other devices, and a description to contextualize the data sent and received with the sensors or other devices.

Further, for an embodiment, the platform server 170 communicates (transmits over the wireless links 115, 116) a computing device profile to the each of the computing devices 110, 190 in parallel with the communication of the configuration. For an embodiment, the computing device profile includes a description and set of instructions for general computing device operations and configurations that define how the computing device operates. For an embodiment the computing device profile may include instructions and configurations for low-power operating modes. For an embodiment, the platform server 170 communicates (transmits over the wireless links 115, 116) a packet profile to the each of the computing devices 110, 190 in parallel with the communication of the configuration. For an embodiment, the packet profile includes a description of the contents of a packet, specifically mapping datum values together into a consolidated packet for transmission over a communication channel from the computing device to the platform server (for an embodiment, through a base station). For example, a packet profile may describe 3 distinct datums from 2 different connected sensors that should be transmitted over a communication channel in one consolidated packet.

Figure 2:
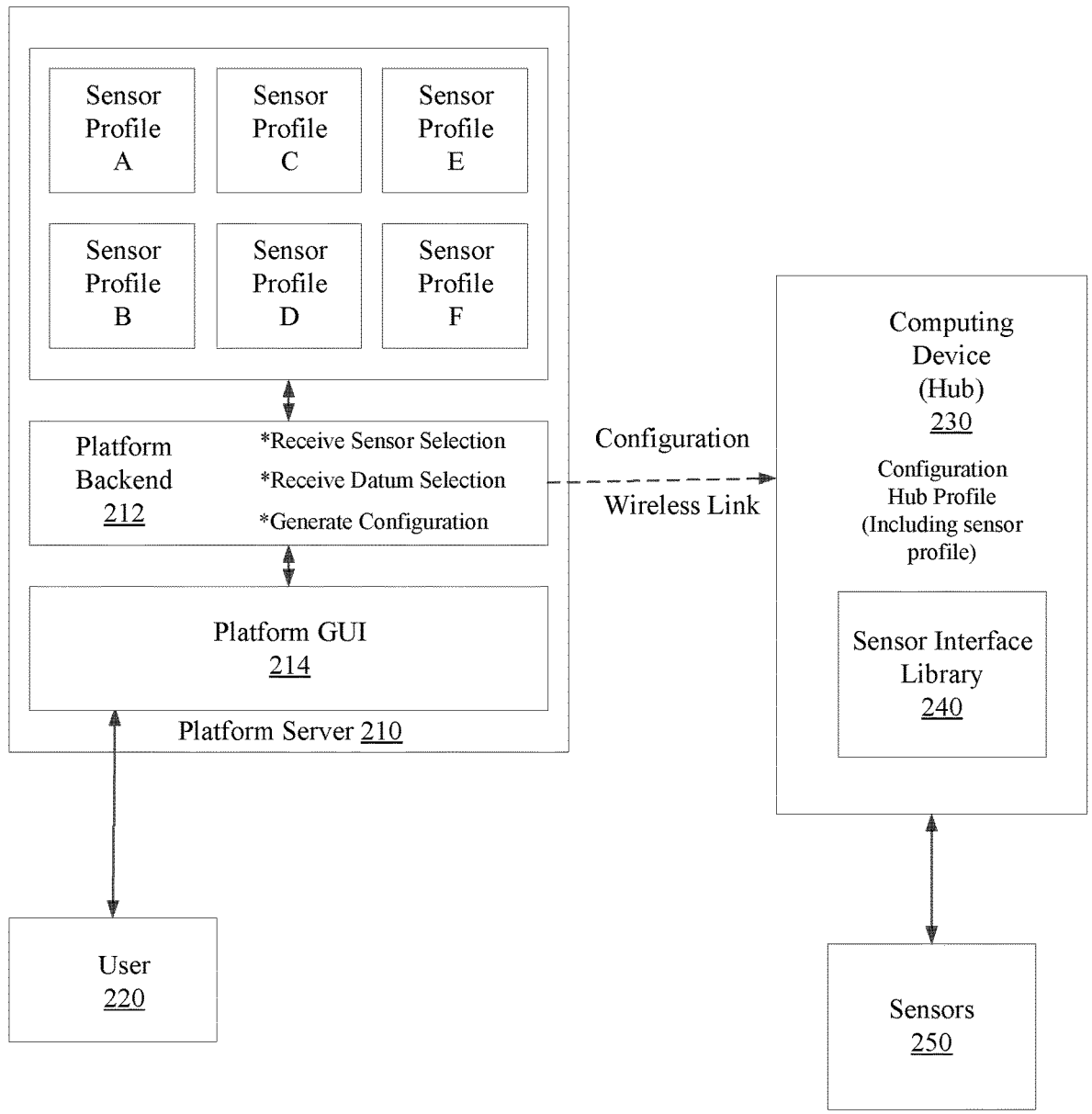
FIG. 2 shows a system for allowing a user to select a sensor and associated datum, a platform server generating a configuration, and the platform server communicating the configuration to a computing device, which then communicates with the selected sensor based on the configuration, according to an embodiment.

FIG. 2 shows a system for allowing a user 220 to select a sensor and associate datum, a platform server 210 generating a configuration, and the platform server 210 communicating the configuration to a computing device 230 which then communicates with the selected sensor 250 based on the configuration, according to an embodiment.

As shown, for an embodiment, the platform server 210 includes a platform GUI (graphical user interface) 214 that allows the user to select sensors and associated datums. A backend server 212 of the platform server 210 receives the sensor selection and retrieves the corresponding sensor profiles (Sensor Profiles A-F) from a sensor profile library 240 managed by the platform server 210. Based on the sensor profile(s) of the selected sensor(s) and the selected associated datum, the platform backend 212 generates the configuration.

The platform server 210 communicates the configuration through a wireless link to a computing device 230. For an embodiment, the configuration includes a computing device (hub) profile and a sensor profile.

Figure 3:
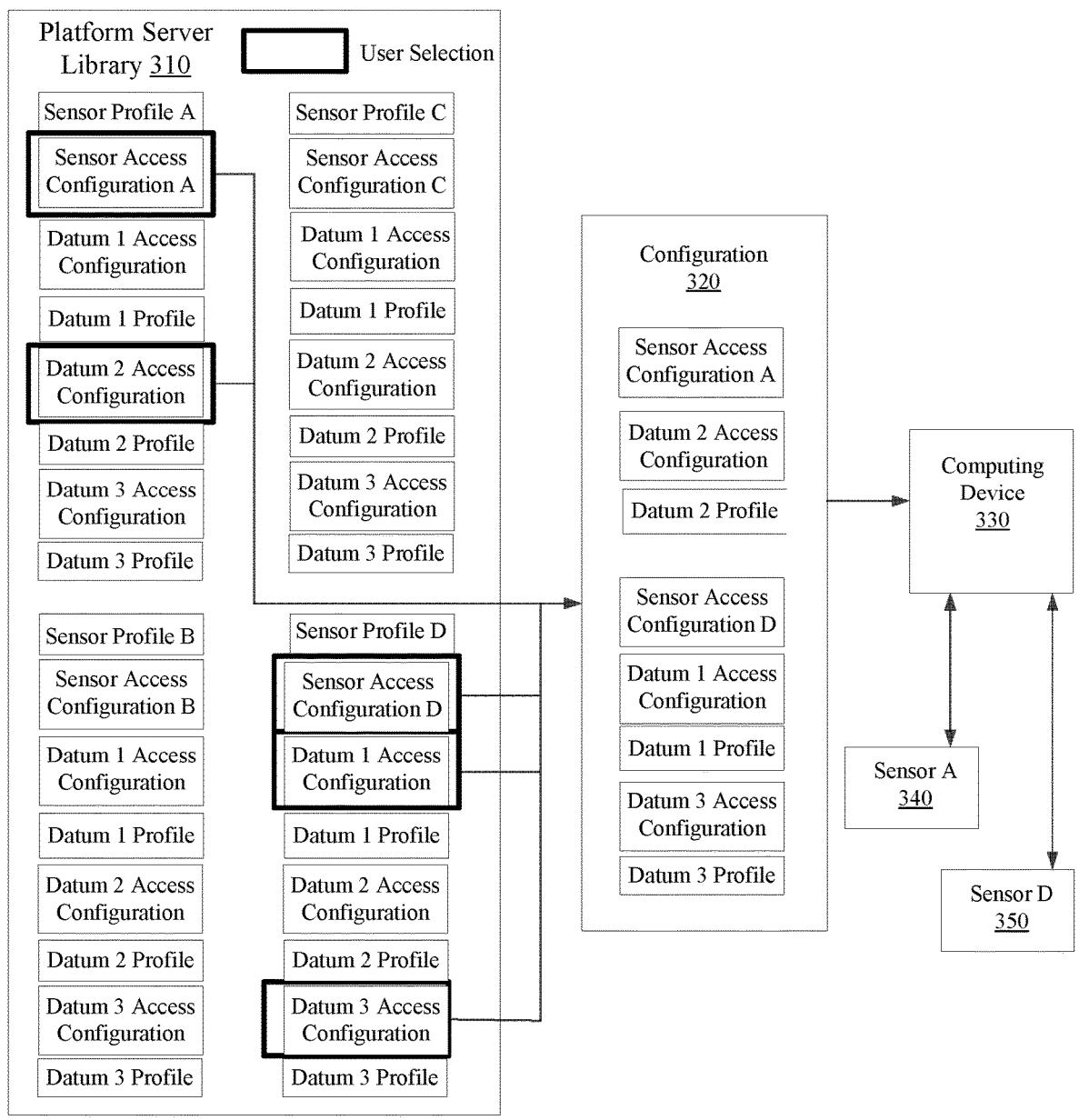
FIG. 3 shows a system for allowing a user to select a sensor and associated datum, a platform server generating a configuration, and the platform server communicating the configuration to a computing device, which then communicates with the selected sensor based on the configuration, according to another embodiment.

FIG. 3 shows a system for allowing a user to select a sensor and associate datum, a platform server generating a configuration, and the platform server communicating the configuration 320 to a computing device which then communicates with the selected sensor based on the configuration, according to another embodiment. As previously stated, the user selects a sensor and selects an associated datum. For an embodiment, this includes the user selecting options from a platform server library, wherein the library includes sensor profiles (for example, Sensor Profile A, Sensor Profile B, Sensor Profile C, Sensor Profile D), and the library includes datum access configurations (for example, Datum 1 Access Configuration, Datum 2 Access Configuration, Datum 3 Access Configuration). Further, the platform server library includes datum profiles (Datum 1 Profile, Datum 2 Profile, Datum 3 Profile). For an embodiment, the user selecting a sensor includes the user selecting a sensor profile, and the user selecting an associated datum includes the user selecting one of the datum access configurations. For an embodiment, the datum profiles are included within the selection of the datum and the datum access configuration.

For an embodiment, the platform server generates the configuration 320 based on the selected sensor access configurations and the datum access configurations. As previously described, the configuration is provided to the computing device 330 through a wired or wireless link. As previously described, the computing device communicates with sensors (sensor A 340, sensor D 350) based on the configuration.

FIG. 4 shows a sensor access configuration 410, a datum access configuration 420, a datum value 430, and a datum profile 440, according to an embodiment. For an embodiment, the sensor access configuration and datum access configuration are used to update the sensor interface library of the selected computing device, allowing the selected computing device to bi-directional communicate with the selected sensor(s) according to the datum(s) contained in the datum access configuration.

For an embodiment, the sensor access configuration includes the sensor access configuration 410, the datum access configuration 420, the datum value 430, and the datum profile 440, and additionally includes a frequency at which the sensor is queried for updated data to populate the datum value. This frequency is determined by the platform server based upon the sensor and datums selected.

For an embodiment, the datum profile 440 is referenced in the datum access configuration 420 and provides the required information to contextualize and decode the datum value to allow for user consumption. The datum value is populated with the response received by the sensor and is placed into a packet as defined by the packet profile 440 for transmission over the wireless or wired link. For an embodiment, a datum offset together with a datum length and/or datum type is used to extract datum from the response received by the computing device from the sensor.

Figure 5:
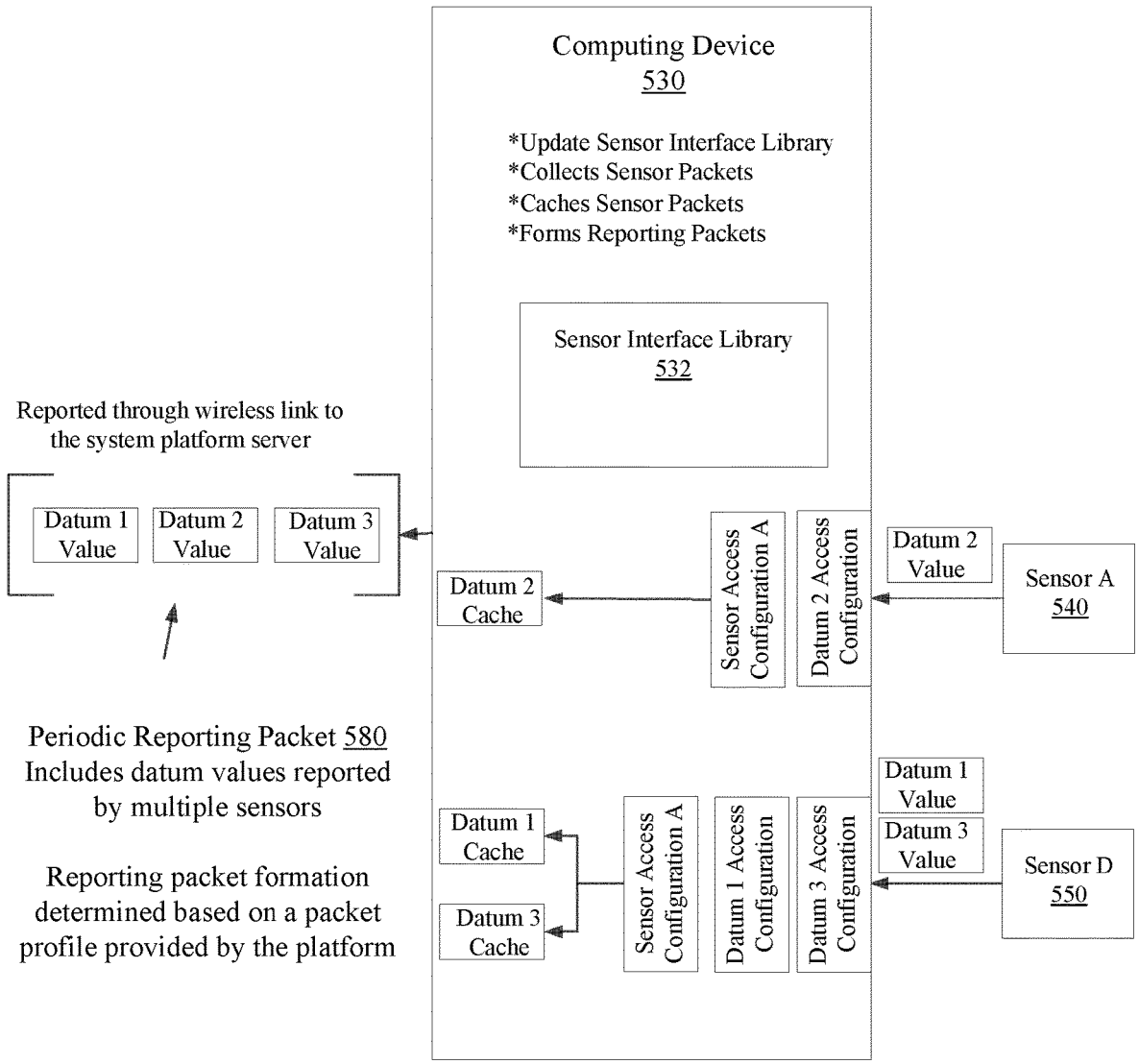
FIG. 5 shows a computing device communicating with a plurality of sensors and generating a reporting packet for reporting back to a platform server, according to an embodiment.

FIG. 5 shows a computing device 530 communicating with a plurality of sensors (sensor A 540, sensor D 550) and generating a reporting packet 580 defined by a packet profile for reporting back to a platform server, according to an embodiment. Datum values (Datum 2 Value, Datum 1 Value, Datum 3 Value) are collected by the computing device 530 using the datum access configurations (Datum 1 access configuration, Datum 2 access configuration, Datum 3 access configuration) provided within the configuration provided by the platform server.

For an embodiment, the computing device 530 includes a sensor interface library 532. For an embodiment, the sensor interface library 532 includes a set of tools that include function and methods (such as functions to set communication baud rates, methods to parse Bluetooth Low Energy protocols, and other general communication functions) to send and retrieve data to and from a sensor, and the configuration includes a set of instructions that determine which tools of the sensor interface library 532 to use and provides parameters (such as the sensor specific baud rate, the type of wireless protocol in use, device security keys, or other sensor/device specific configuration parameters) for the tools being used. For an embodiment, the set of tools include a function to extract datums from the broadcast/response Messages received from the sensor using configuration parameters. An embodiment includes the computing device 530 operating the sensor interface library 532. The computing device 530 updates the operation of the sensor interface library 532 based on the received configuration. The computing device 530 communicates with the selected sensor using the updated sensor interface library. For an embodiment, as previously stated, the sensor interface library includes a set of tools, and the configuration includes a set of instructions that determine which tools of the sensor interface to use and provides parameters for the tools being used.

For an embodiment, the sensor interface library 532 includes software within the computing device 530 that contains the functions/methods that can be called upon with arguments/parameters as defined in the configuration that receives the configuration and updates its operations based upon the configuration which allows the computing device 530 to communicate with the selected sensors to retrieve the selected datums. For an embodiment, the sensor interface library 532 includes a set of tools (functions) while the configuration includes the set of instructions to build to desired outcome (what functions to call and with what arguments/parameters). For example, the sensor access configuration may identify, for example, a selection of a BLE sensor. The computing device 530 accesses the BLE function from the sensor interface library. Further, for example, the datum access configuration provides as a parameter/argument a memory offset as an input to the accessed BLE function.

At least some embodiments further include generating, by the platform server, the configuration based on capabilities of the sensor interface library 532 and based on a current computing device profile of the computing device 530. That is, for an embodiment, the configuration is generated by the platform server based upon the user input, based on the capabilities of the sensor interface library, and based on the current configuration of the computing device 530.

For an embodiment, generation of the configuration is further based on a distribution of selected sensors and selected datums. For example, if one BLE (Bluetooth Low Energy) sensor is selected by the user, the configuration may be to query the one BLE sensor every 1 second. However, if the user were to select BLE sensors, the configuration may be to query each sensor every 10 seconds (because the capability of the device interface of the sensor interface library is 1 query/second).

For an embodiment, generation of the configuration is further based on capabilities of the sensor interface library and/or a computing device profile. For an embodiment, capabilities of the sensor interface library are defined by the computing device profile of the computing device. For example, a low power configured hub (e.g. solar powered) may have a maximum device sampling rate of once per hour. Therefore, the configuration generated by the platform has a sampling rate no less than once per hour.

For an embodiment, the computing device 530 caches the datum values, and then configures the reporting packet 580 based on a packet profile included within the configuration provided by the platform server. The reporting packet 580 includes the datum values (Datum 2 Value, Datum 1 Value, Datum 3 Value) collected by the computing device 530.

Figure 6:
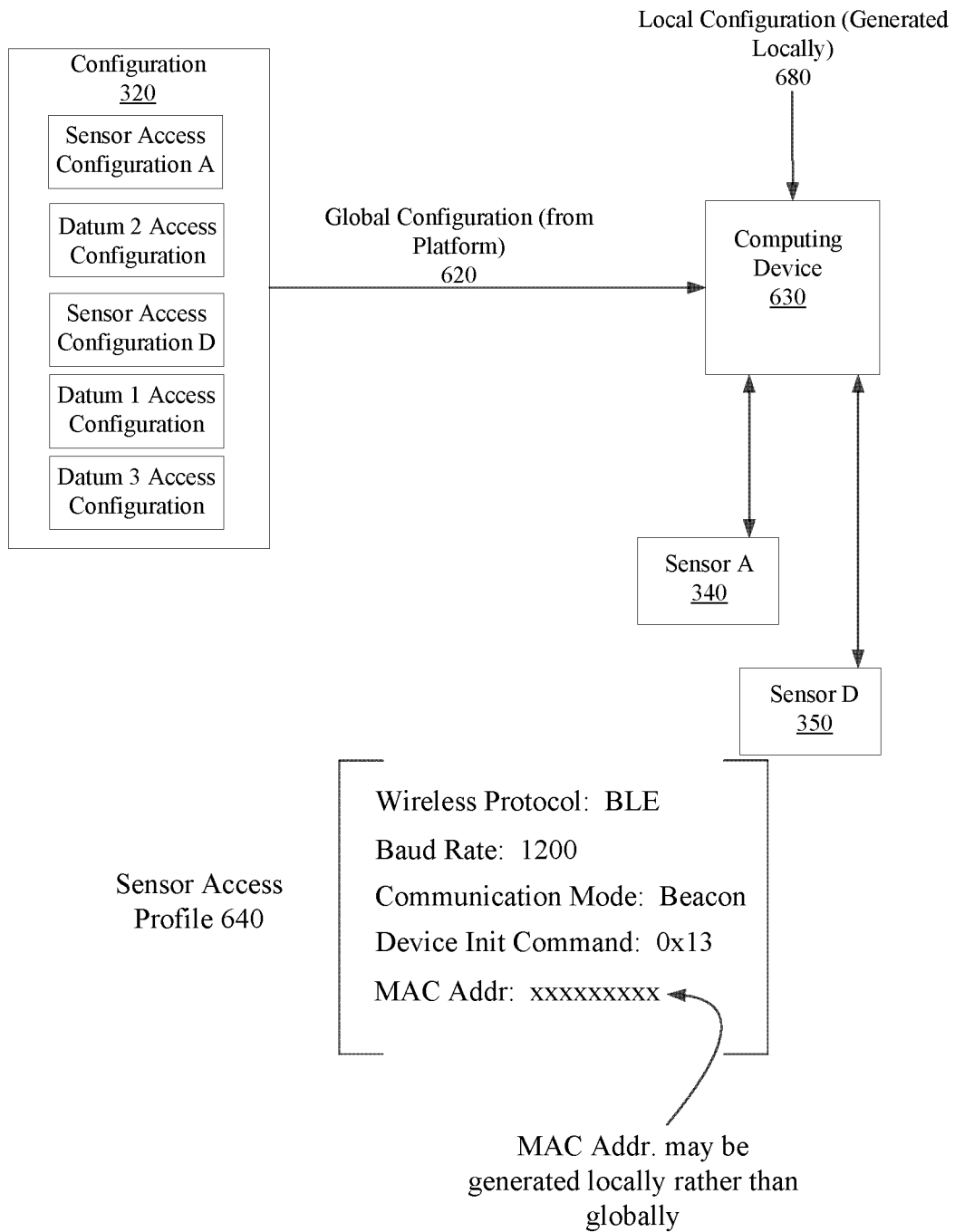
FIG. 6 shows a computing device communicating with multiple sensors, wherein the computing device receives both a global configuration and a local configuration, according to an embodiment.

FIG. 6 shows a computing device 630 communicating with a plurality of sensors 340, 350, wherein the computing device 630 receives both a configuration 620 (for an embodiment, the configuration 620 is a global configuration) and a local configuration 680, according to an embodiment.

For an embodiment, a sensor access profile 640 of the configuration includes global configuration parameters and local information parameters. The global configuration may include, for example, a wireless protocol, a baud rate, a communication mode, and a device initial command. The local configuration may include, for example, a MAC address.

For an embodiment, the local configuration is entered directly by a user through a local interface of the computing device 630. For an embodiment, the local configuration is not entered by a user, but rather determined by the computing device 630. For an embodiment, the local configuration is a UID (Unique ID) (for example a MAC address) determined based on a selection of the user, determined based upon the UID of a sensor signal first received by the computing device, or determined based upon a UID of a sensor signal received by the computing device while the computing device is inside a geofence. For an embodiment, the local configuration includes a security key. For an embodiment, the local configuration includes a sensor calibration parameter.

Figure 7:
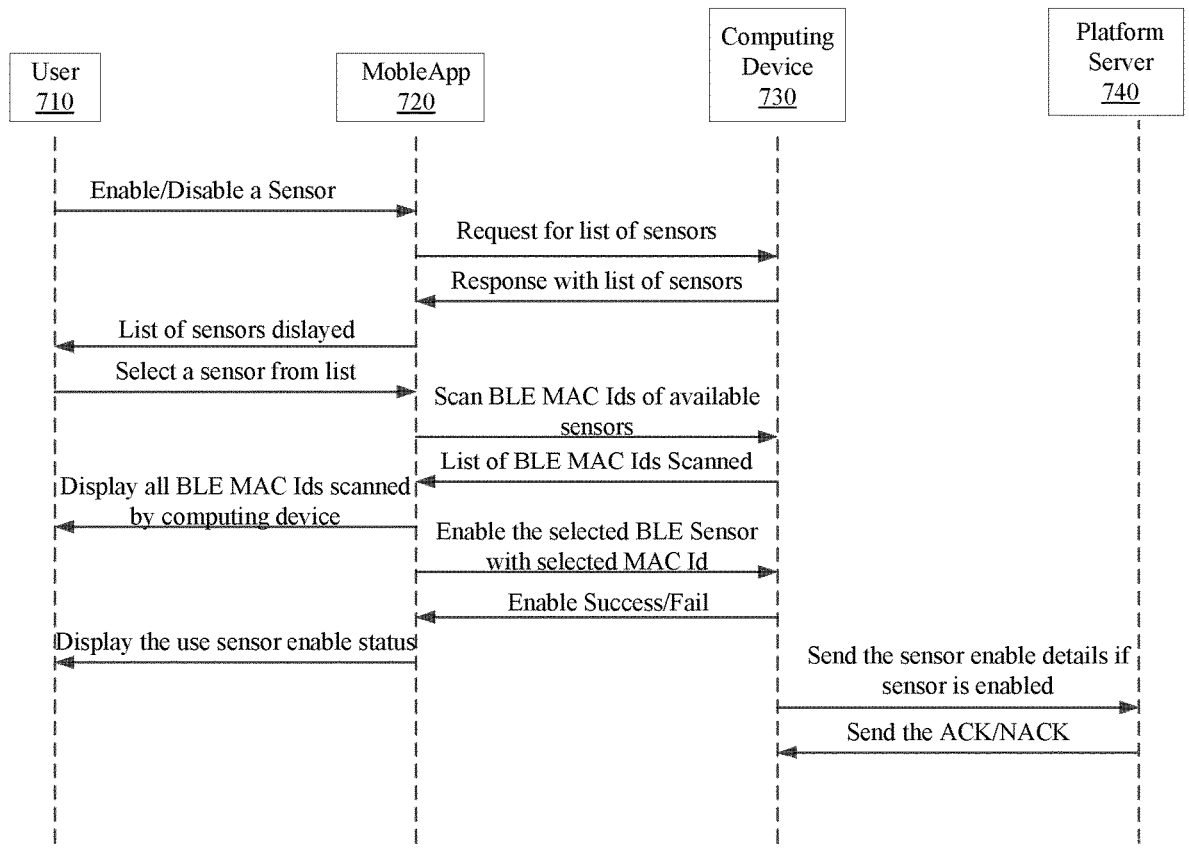
FIG. 7 is a timeline showing actions of a user inputting a local configuration to a computing device, according to an embodiment.

FIG. 7 is a timeline showing actions of a user 710 inputting a local configuration to a computing device 730, according to an embodiment. As shown, the user 710 may enable/disable a sensor of the computing device 730 through the use of a mobile application 720 operating, for example, on a mobile computing device. The mobile computing device interfaces with the computing device through a wired or wireless interface. The mobile application 720 requests a list of sensors from the computing device 730. The computing device 730 responds with a list of sensors which the mobile application 720 then displays to the user 710. The user 710 may then select one or more sensors. The mobile application 720 may then scan, for example, BLE MAC Ids of the available sensors. The computing device may then generate a list of BLE MAC Ids that are scanned. The mobile application 720 then displays all of the BLE MAC Ids scanned by the computing device 730. The mobile application 720 then enables the selected BLE sensors with the selected MAC Id(s). The computing device 730 may then indicate enabled success or failure of the selected BLE sensors. The mobile application 720 then displays to the user the sensor enable status. Further, the computing device 730 sends the sensor enable details if the sensor is enabled to the platform server 740. The platform server 740 responds with an ACK/NACK (acknowledgement/negative acknowledgement).

Figure 8:
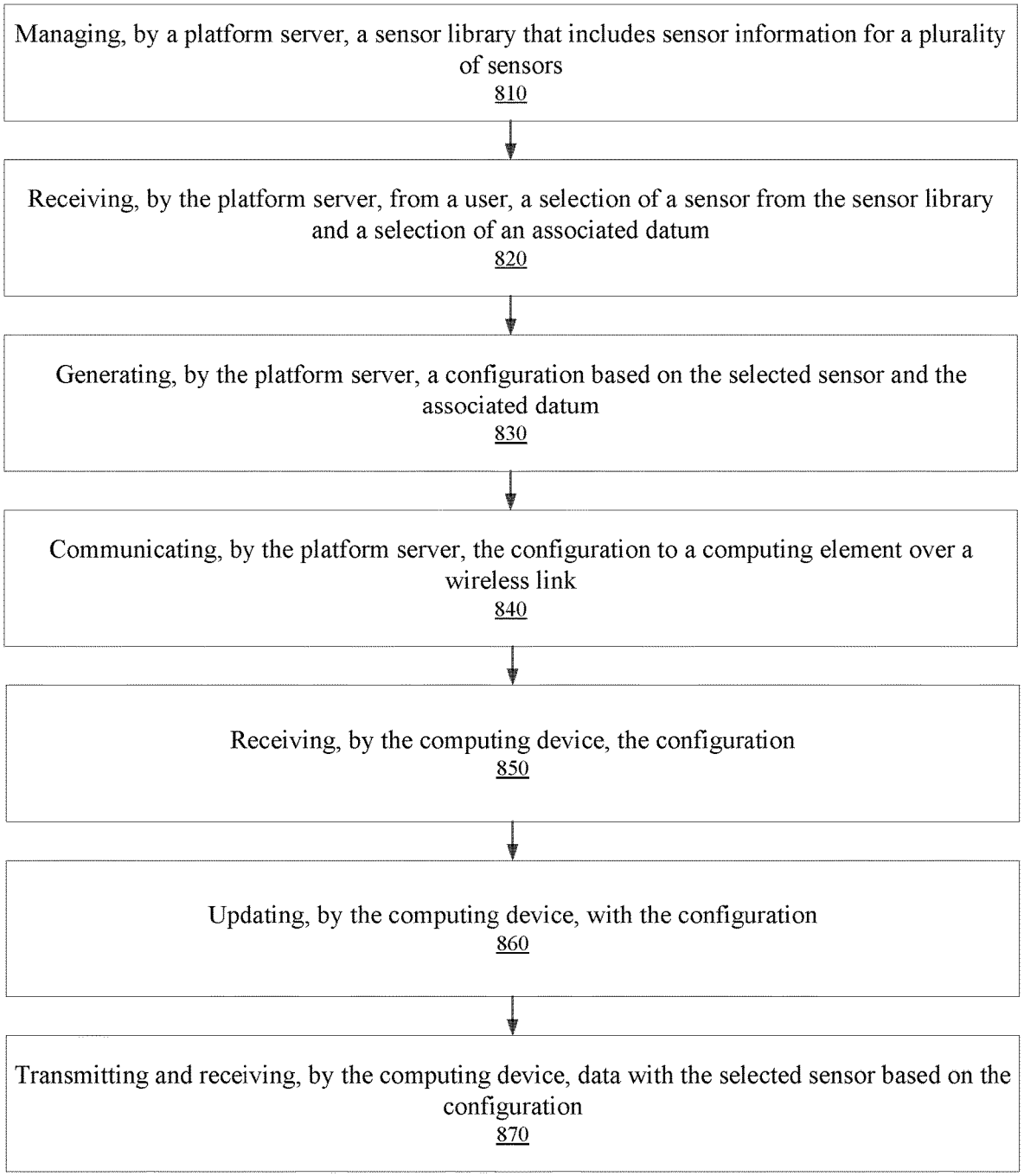
FIG. 8 is a flow chart of steps of a method of selectable and automated sensor integration and data collection, according to an embodiment.

FIG. 8 is a flow chart of steps of a method of selectable and automated sensor integration and data collection, according to an embodiment. A first step 810 includes managing, by a platform server, a sensor library that includes sensor information for a plurality of sensors. A second step 820 includes receiving, by the platform server, from a user, a selection of a sensor from the sensor library and a selection of an associated datum. A third step 830 includes generating, by the platform server, a configuration based on the selected sensor and the associated datum. A fourth step 840 includes communicating, by the platform server, the configuration to a computing device over a wireless link. For an embodiment, the wireless link includes a satellite wireless link. For an alternate embodiment, the communicating is over a wired link. A fifth step 850 includes receiving, by the computing device, the configuration. A sixth step 860 includes updating, by the computing device, with the configuration. A seventh step 870 includes transmitting and receiving, by the computing device, data with the selected sensor based on the configuration.

At least some embodiments further include operating, by the computing device, a sensor interface library that receives the configuration. Further, the computing device, updates operation of the sensor interface library based on the received configuration and communicates with the selected sensor using the updated sensor interface library. For an embodiment, the sensor interface library includes a set of tools, and the configuration includes a set of instructions that determine which tools of the sensor interface to use and provides parameters for the tools being used. For an embodiment, the set of tools include functions and methods to send and retrieve data to and from a sensor. For an embodiment, the sensor interface library of the computing device includes software within the computing device that contains functions that can be called upon with arguments/parameters as described in the configuration. The computing device receives the configuration and updates its operations based upon the configuration allowing it to communicate with the selected sensors to retrieve the selected datums. For an embodiment, the sensor interface library includes the set of tools (functions) while the configuration file is a set of instructions for building a desired outcome (what functions to call and with what arguments/parameters). For example, a sensor access configuration may identify to retrieve and use a BLE (Bluetooth Low Energy) sensor library function, and the datum access configuration may be selected to provide a memory offset argument to the BLE function that is part of the sensor interface library.

For an embodiment, the platform server generates the configuration based on capabilities of the sensor interface library. The capabilities include, for example, the supported communication protocols, allocated memory size, and the locally versus globally available configuration parameters. For an embodiment, the platform server generates the configuration based on a current configuration of the computing device. For an embodiment, the platform server generates the configuration based on the capabilities of the device interface library and based upon the device's current configuration. For an embodiment, the platform server generates the configuration based on a distribution of selected sensors and selected datums. For example, if one BLE sensor is selected, the configuration may query the sensor every 1 second. However, if 10 BLE sensors are selected, the configuration may query each sensor every 10 seconds (because the capability of the sensor interface library is 1 query/second.)

For an embodiment, the platform server generates the configuration based on a computing device profile. For an embodiment, capabilities of the sensor interface library are defined by the devices computing device profile. For example, the computing device may be a low power configured hub (for example, solar powered) that has a maximum device sampling rate of once per hour. Therefore, the configuration generated by the platform would include a sampling rate of no less than once per hour.

For an embodiment, the platform server generates the configuration based on operating conditions of the computing device. For an embodiment, generating the configuration based on the conditions of the computing device is dynamically/adaptively performed based on, for example, the battery level of the computing device. If, for example, the battery level of the computing device is low, the configuration may be locally updated to query less often, at less power.

At least some embodiments further include providing the user with an ability to decode datum values based on an associated datum profile contained in the configuration at either the server platform or at the computing device. For example, for at least some embodiments, users can view/interpret (wherein the interpretation is based on the datum profile and performed at either the server platform, computing device, or at an associated mobile device) the transmitted (over the wireless link) datum values based upon their associated datum profile that is stored on both the computing device as well as the platform server. Allowing users to interpret the data on both platforms while sending minimal data (contextless data) over the wireless link. For an embodiment, contextless data includes data not interpretable by humans alone. For example, a data of 0×34F2 needs additional information, such as, floating point, or units: degree Celsius, to be useful to the user.

For an embodiment, the associated datum includes a datum value and a datum profile, wherein the datum profile includes at least datum type (for example, floating point vs int). For at least some embodiments, the datum profile may include units (such as, degrees Celsius, endianness, data offset), and datum length (for example, 4 bytes).

For at least some embodiments, the platform additionally transmits a packet profile that provides for mapping of collected datums into reporting packets to be wirelessly communicated to the platform server. That is, for an embodiment, the packet profile is transmitted independent from the transmission of the configuration.

For an embodiment, the platform additionally transmits a computing device profile that provides operating instructions for the device. That is, the computing device profile is transmitted independent from the transmission of the configuration.

For an embodiment, the datum profile includes a common unit field, wherein the common unit field is shared with other datum profiles, thereby allowing a consolidation of disparate datums based upon a measured unit type of the disparate datums.

For an embodiment, the configuration is generated based on the selected sensor and the associated datum comprises generating a sensor profile of the selected sensor which is included within the configuration.

For an embodiment, the configuration further includes a global portion provided by the platform server, and a local portion is provided to the computing device local to the computing device. For an embodiment, the local portion of the configuration is provided locally by the user. For example, the user may use a QR code, or a Bluetooth interface to communicate the local portion to the computing device. For an embodiment, the local portion of the configuration is generated locally by the computing device. For example, the sensor may be selected locally by the computing device based on a sensed receive signal power of different sensors. That is, for example, at least one sensor providing the largest received signal power may be selected either alternatively or additionally. For an embodiment, the computing device can select a sensor as the sensor in which the computing device first receives an input.

Although specific embodiments have been described and illustrated, the embodiments are not to be limited to the specific forms or arrangements of parts so described and illustrated. The described embodiments are to only be limited by the claims.

What is claimed:
1. A method, comprising:
  managing, by a platform server, a sensor library that includes sensor information for a plurality of sensors;
  receiving, by the platform server, from a user, a selection of a sensor from the sensor library and a selection of an associated datum;
  generating, by the platform server, a configuration based on the selected sensor and the associated datum;
  communicating, by the platform server, the configuration to a computing device over a wireless link through a base station and a satellite link, wherein the computing device is one of a plurality of computing devices;
  receiving, by the computing device, the configuration;
  updating, by the computing device, with the configuration; and
  reporting, by the computing device, data of the selected sensor, wherein the reporting comprises synchronizing, transmitting, and receiving through the wireless link, by the computing device, the data with the base station with respect to other of the plurality of computing devices, wherein the reporting, by the other plurality of devices, is based on a datum access configuration of the configuration;
  ensuring synchronization between the plurality of sensors through management of the plurality of sensors, wherein the synchronization between the plurality of sensors distributes timing of reporting of data of each of the plurality of sensors to prevent the reporting of one sensor from interfering with the reporting of another sensor and to provide for efficiency in the reporting of the data;
  wherein generation of the configuration is further based on a distribution of selected sensors and selected datums, wherein the configuration queries each sensor at a rate that is based on a number of sensors being queried;
  wherein the configuration is updated to query less often as a power level of the computing device decreases; and
  wherein the selection of the sensor further includes a local selection based on received signal powers from the plurality of sensors.

2. The method of claim 1, further comprising:
  operating, by the computing device, a sensor interface library that receives the configuration;
  updating, by the computing device, operation of the sensor interface library based on the received configuration; and
  communicating, by the computing device, with the selected sensor using the updated sensor interface library.

3. The method of claim 2, wherein the sensor interface library includes a set of tools, and the configuration includes a set of instructions that determine which tools of the sensor interface to use and provides parameters for the tools being used.

4. The method of claim 2, further comprising generating, by the platform server, the configuration based on capabilities of the sensor interface library.

5. The method of claim 2, further comprising generating, by the platform server, the configuration based on a current configuration of the computing device.

6. The method of claim 1, wherein generation of the configuration is further based on a distribution of selected sensors and selected datums.

7. The method of claim 1, wherein generation of the configuration is further based on a computing device profile.

8. The method of claim 1, wherein generation of the configuration is further based on operating conditions of the computing device.

9. The method of claim 1, further comprising:
  providing the user with an ability to decode datum values based on an associated datum profile contained in the configuration at either the server platform or at the computing device.

10. The method of claim 1, wherein the datum access configuration further coordinates timing and frequency of reporting of the computing device to the base station through the satellite link.

11. The method of claim 1, wherein the associated datum includes a datum value and a datum profile, wherein the datum profile includes at least datum type.

12. The method of claim 11, wherein the datum profile includes a common unit field, wherein the common unit field is shared with other datum profiles, thereby allowing a consolidation of disparate datum based upon a measured unit type of the disparate datums.

13. The method of claim 1, wherein the platform server additionally transmits a packet profile that provides for mapping of collected datums into reporting packets to be wirelessly communicated to the platform server.

14. The method of claim 1, wherein the platform additionally transmits a computing device profile that provides operating instructions for the computing device.

15. The method of claim 1, generating the configuration based on the selected sensor and the associated datum comprises generating a sensor profile of the selected sensor which is included within the configuration.

16. The method of claim 1, wherein the configuration further includes a global portion provided by the platform server, and a local portion is provided to the computing device local to the computing device.

17. The method of claim 16, wherein the local portion of the configuration is provided locally by the user.

18. The method of claim 16, wherein the local portion of the configuration is generating locally by the computing device.

19. A method, comprising:

managing, by a platform server, a sensor library that includes sensor information for a plurality of sensors;

receiving, by the platform server, from a user, a selection of a sensor from the sensor library and a selection of an associated datum;

generating, by the platform server, a configuration based on the selected sensor and the associated datum;

communicating, by the platform server, the configuration to a computing device over a wireless link through a base station and a satellite link, wherein the computing device is one of a plurality of computing devices;

wherein the computing device receives and is updated with the configuration;

wherein the computing device reports data of the selected sensor, wherein reporting including transmitting and receiving through the wireless link the data with the base station with respect to other of the plurality of computing devices, wherein the other of the plurality of devices reports based on a datum access configuration of the configuration;

ensuring synchronization between the plurality of sensors through management of the sensors, wherein the synchronization between the plurality of sensors distributes timing of reporting of data of each of the plurality of sensors to prevent the reporting of one sensor from interfering with the reporting of another sensor and to provide for efficiency in the reporting of the data;

wherein generation of the configuration is further based on a distribution of selected sensors and selected datums, wherein the configuration queries each sensor at a rate that is based on a number of sensors being queried;

wherein the configuration is updated to query less often as a power level of the computing device decreases; and wherein the selection of the sensor further includes a local selection based on received signal powers from the plurality of sensors.

20. An automated sensor integration and data collection system, comprising:

a platform server operative to:

manage a sensor library that includes sensor information for a plurality of sensors;

receive from a user, a selection of a sensor from the sensor library and a selection of an associated datum;

generate a configuration based on the selected sensor and the associated datum;

communicate the configuration to a computing device over a wireless link through a base station and a satellite link, wherein the computing device is one of a plurality of computing devices;

the computing device operative to receive the configuration;

update with the configuration;

reports data of the selected sensor, wherein reporting including transmitting and receiving through the wireless link the data with the base station with respect to other of the plurality of computing devices, wherein the other of the plurality of devices reports based on a datum access configuration of the configuration;

ensure synchronization between the plurality of sensors through management of the sensors, wherein the synchronization between the plurality of sensors distributes timing of reporting of data of each of the plurality of sensors to prevent the reporting of one sensor from interfering with the reporting of another sensor and to provide for efficiency in the reporting of the data;

wherein generation of the configuration is further based on a distribution of selected sensors and selected datums, wherein the configuration queries each sensor at a rate that is based on a number of sensors being queried;

wherein the configuration is updated to query less often as a power level of the computing device decreases; and wherein the selection of the sensor further includes a local selection based on received signal powers from the plurality of sensors.

\* \* \* \* \*